US012502983B2

(12) United States Patent
Yamada et al.

(10) Patent No.: US 12,502,983 B2
(45) Date of Patent: Dec. 23, 2025

(54) ELECTRIC VEHICLE

(71) Applicant: SUBARU CORPORATION, Tokyo (JP)

(72) Inventors: Keigo Yamada, Tokyo (JP); Yoshinobu Yamazaki, Tokyo (JP); Yoshiyuki Jin, Tokyo (JP); Akihiro Nabeshima, Tokyo (JP); Takeshi Yoneda, Tokyo (JP); Fumiya Sato, Tokyo (JP); Hiroshi Kusano, Tokyo (JP); Takumi Araki, Tokyo (JP); Shuntaro Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 364 days.

(21) Appl. No.: 18/124,452

(22) Filed: Mar. 21, 2023

(65) Prior Publication Data

US 2023/0311671 A1 Oct. 5, 2023

(30) Foreign Application Priority Data

Mar. 31, 2022 (JP) ................... 2022-058966

(51) Int. Cl.
*B60L 15/00* (2006.01)
*B60L 3/00* (2019.01)
(Continued)

(52) U.S. Cl.
CPC .......... *B60L 15/2009* (2013.01); *B60L 3/0061* (2013.01); *B60L 7/26* (2013.01); *B60L 2240/423* (2013.01)

(58) Field of Classification Search
CPC .... Y02T 10/72; B60L 15/20; B60L 2240/423; B60L 3/0061; B60L 15/2009; H02P 29/024
See application file for complete search history.

(56) References Cited

U.S. PATENT DOCUMENTS 5,934,398 A * 8/1999 Hotta .................. B60L 15/2009
318/434
11,021,158 B2 * 6/2021 Mueller ............ B60W 50/0098
(Continued)

FOREIGN PATENT DOCUMENTS

DE 102008055897 A1 * 5/2010 ............. F16D 48/06
JP 2009232485 A * 10/2009
(Continued)

OTHER PUBLICATIONS

Mercedes-Benz Used Parts, "Vehicle dynamics control unit"; 4 pages, retrieved Sep. 5, 2025, from https://usedparts.mercedes-benz.com/a/vehicle-dynamics-control-unit/a0009003534-aa/ (Year: 2025).*

*Primary Examiner* — David A Testardi
(74) *Attorney, Agent, or Firm* — TROUTMAN PEPPER LOCKE LLP (57) ABSTRACT

An electric vehicle includes a motor and a controller. The controller is configured to; based on determining that the electric motor is in the locked state, set a search target torque greater than a value of torque demanded by a driver, and execute an increase of the motor torque up to the set target torque; upon making a determination that the locked state is ceased, store a value of the target torque at a time of making the determination, and execute a decrease of the target torque; and when a second value of the torque demanded by the driver becomes the value of the target torque or more after the decrease of the target torque, set a second value of the target torque in accordance with the second value of the torque demanded by the driver, and drive the electric motor in accordance with the set target torque.

9 Claims, 3 Drawing Sheets

(51) Int. Cl.
    *B60L 7/26*           (2006.01)
    *B60L 15/20*         (2006.01)

(56) References Cited

U.S. PATENT DOCUMENTS

| | | | |
|---|---|---|---|
| 2003/0130772 A1* | 7/2003 | Yanagida | B60L 3/0061 701/22 |
| 2008/0006457 A1* | 1/2008 | Fujimoto | B60W 10/02 290/37 R |
| 2013/0179004 A1* | 7/2013 | Nihei | B60T 8/1755 701/1 |
| 2014/0354210 A1* | 12/2014 | Seo | H02P 23/03 318/798 |
| 2015/0112535 A1* | 4/2015 | Ota | B60L 15/36 701/22 |
| 2018/0234038 A1* | 8/2018 | Aoki | H02P 27/06 |
| 2022/0212546 A1* | 7/2022 | Yano | H02M 7/5395 |

FOREIGN PATENT DOCUMENTS

| | | | | |
|---|---|---|---|---|
| JP | 2010130890 | A | * | 6/2010 |
| JP | 2010241385 | A | * | 10/2010 |
| JP | 2011229326 | A | * | 11/2011 |
| JP | 2013132137 | A | * | 7/2013 |
| JP | 2014230367 | A | * | 12/2014 |
| JP | 2015211476 | A | * | 11/2015 |
| JP | 2015229365 | A | * | 12/2015 |
| JP | 2016028922 | A | * | 3/2016 |
| JP | 2017100475 | A | * | 6/2017 |
| JP | 2017177968 | A | * | 10/2017 |
| JP | 2012-105482 | A | | 5/2021 |
| JP | 2022013162 | A | * | 1/2022 |

\* cited by examiner

ELECTRIC VEHICLE

CROSS-REFERENCE TO RELATED APPLICATION

The present application claims priority from Japanese Patent Application No. 2022-058966 filed on Mar. 31, 2022, the entire contents of which are hereby incorporated by reference.

BACKGROUND

The disclosure relates to an electric vehicle powered by an electric motor.

Recently, electric vehicles (BEVs) powered by electric motors and not emitting exhaust gas are in practical use. For example, all-wheel-drive electric vehicles each may include a front motor configured to drive front wheels and a rear motor configured to drive rear wheels. An example of such motors is disclosed in Japanese Unexamined Patent Application Publication No. 2012-105482.

When an electric vehicle tries to go over, for example, a step, wheels (tires) of the electric vehicle can hit a step and become stuck; that is, a motor that drives the wheels can become locked. In a case where the motor is a synchronous (three-phase) motor, in which three-phase current creates a rotating magnetic field, and tries to output torque in the locked state, concentration of current is caused in a specific phase (one of the three phases). Consequently, components such as the electric motor, three-phase wiring, and an inverter, notably parts and components corresponding to the specific phase, can become overheated. As a typical measure to suppress overheat and protect the components, the output of the synchronous motor (electric motor) is restricted.

SUMMARY

An aspect of the disclosure provides an electric vehicle. The electric vehicle includes an electric motor being a synchronous motor configured to directly drive at least one wheel; and a controller that controls the electric motor in accordance with a target torque. The controller is configured to: determine, based on motor torque of the electric motor and a number of revolutions of the electric motor, whether the electric motor is in a locked state; based on determining that the electric motor is in the locked state, set, as the target torque of the electric motor, a first search target torque having a value greater than a first value of torque demanded by a driver, and execute a first increase of the motor torque up to the set target torque, each value of the torque demanded by the driver being determined in accordance with a degree of accelerator pedal depression by the driver; upon making a first determination that the locked state is ceased before or upon a lapse of a predetermined time period from start of the first increase of the motor torque, store a first value of the target torque at a time of making the first determination, and execute a first decrease of the target torque after storing the first value of the target torque; and when a second value of the torque demanded by the driver becomes the first value of the target torque or more after the first decrease of the target torque, set a second value of the target torque in accordance with the second value of the torque demanded by the driver, and drive the electric motor in accordance with the set target torque.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

An example of electric vehicles is powered by a synchronous electric motor without a clutch between the motor and drive wheels; that is, the drive wheels of the electric vehicle are driven directly by the motor. The electric vehicle can fail to go over a step although the electric vehicle is supposed to be able to go over such a step in light of the performance specifications of the motor (vehicle). For example, the aforementioned protective function (protective action) is performed when the accelerator pedal is gradually depressed to cause the electric vehicle to go over a step in a state in which the synchronous motor is locked (i.e., in a state in which the wheels hit a step and become stuck). In such cases, it is determined that the motor is in a state of overheating (in a locked state), and the output torque is reduced (restricted) before the synchronous motor delivers the maximum performance (output torque).

It is desirable to provide an electric vehicle that includes a synchronous motor configured to directly drive wheels of the electric vehicle and that is capable of improving the run-through performance (e.g., step-climbing ability) without interfering with protection against overheating (the output restriction) in a state in which the motor is locked when the electric vehicle is trying to go over a step.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. An all-wheel-drive electric vehicle (AWD EV) will be described below as an example of the electric vehicle according to the embodiment of the disclosure.

Figure 1:
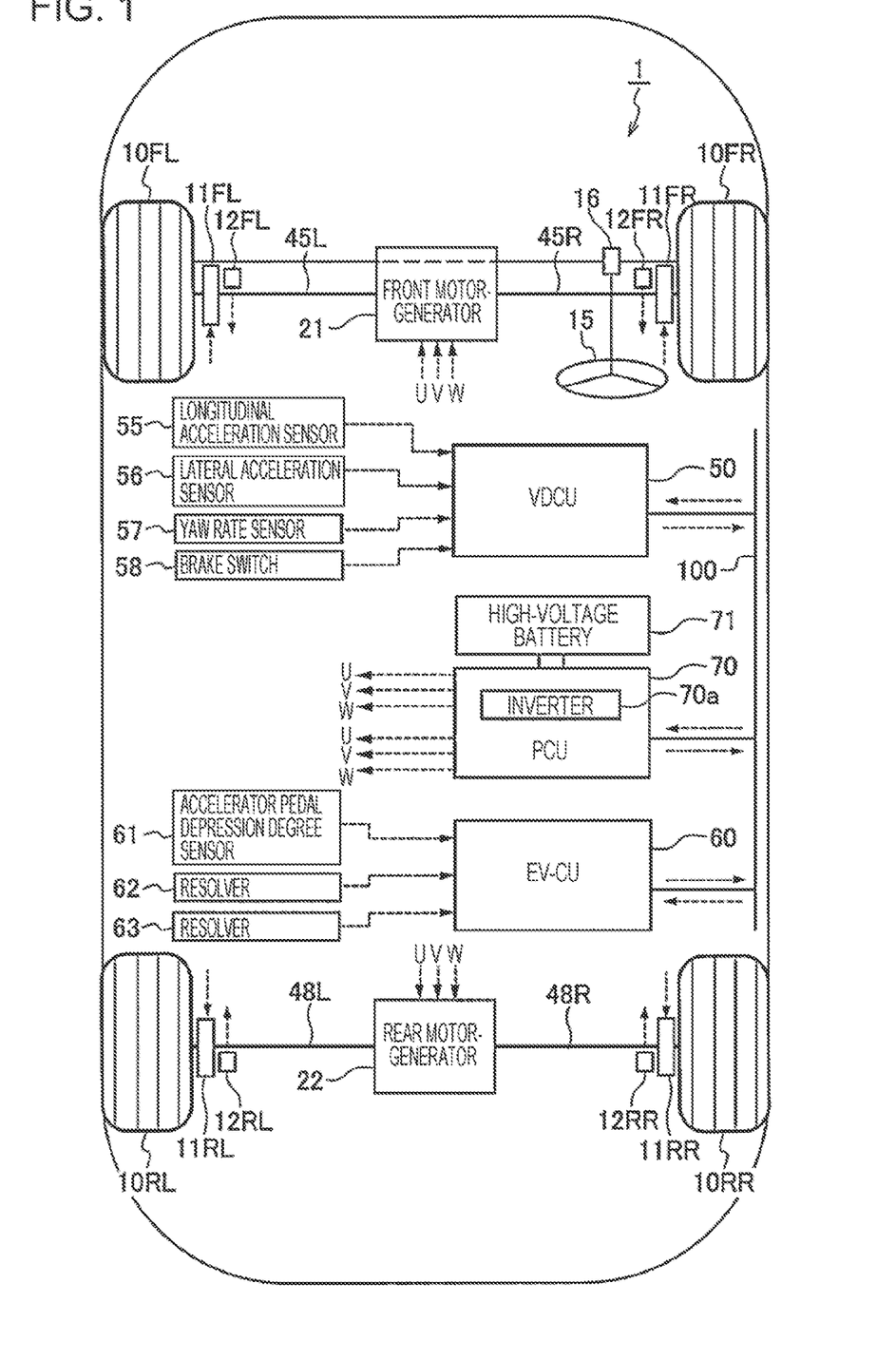
FIG. 1 illustrates an overall configuration of an all-wheel-drive electric vehicle according to an embodiment.

Referring to FIG. 1, the following describes a configuration of an all-wheel-drive electric vehicle (AWD EV) 1 according to an embodiment. FIG. 1 illustrates an overall configuration of the all-wheel-drive electric vehicle 1.

A front motor-generator 21 is coupled to a left front wheel 10FL and to a right front wheel 10FR. A left front-wheel drive shaft 45L forms a connection between the front motor-generator 21 and the left front wheel 10FL to transmit torque to the left front wheel 10FL. A right front-wheel drive shaft 45R forms a connection between the front motor-generator 21 and the right front wheel 10FR to transmit torque to the right front wheel 10FR. The front motor-generator 21 is directly coupled to the front wheels 10FL and 10FR and directly drives the front wheels 10FL and 10FR. In one embodiment, the front motor-generator 21 may serve as an "electric motor".

The word "directly" is used to describe a state in which the number of revolutions of the front wheels 10FL and 10FR (the vehicle speed) is uniquely determined in accordance with (is in a one-to-one relationship with) the number of revolutions of the front motor-generator 21 without involvement of, for example, a torque converter or a clutch. In the present embodiment, the left front-wheel drive shaft 45L and the right front-wheel drive shaft 45R are directly driven by the front motor-generator 21. In some embodiments, the left front-wheel drive shaft 45L and the right front-wheel drive shaft 45R are driven by way of a pair of gears (a reduction gear) having a fixed gear ratio or by way of gears (a reduction gear) and a front differential.

A rear motor-generator 22 is similar to the front motor-generator 21. The rear motor-generator 22 is coupled to a left rear wheel 10RL and to a right rear wheel 10RR. A left rear-wheel drive shaft 48L forms a connection between the rear motor-generator 22 and the left rear wheel 10RL to transmit torque to the left rear wheel 10RL. A right rear-wheel drive shaft 48R forms a connection between the rear motor-generator 22 and the right rear wheel 10RR to transmit torque to the right rear wheel 10RR. The rear motor-generator 22 is directly coupled to the rear wheels 10RL and 10RR and directly drives the rear wheels 10RL and 10RR. The word "directly" may be understood similarly to the meaning mentioned above in relation to the front motor-generator 21. In one embodiment, the rear motor-generator 22 may serve as an "electric motor".

The front motor-generator 21 and the rear motor-generator 22 are synchronous motor-generators, each of which functions as both a synchronous motor that converts supplied electric power (three-phase current) to mechanical power and a generator that converts received mechanical power to electric power. For example, the front motor-generator 21 and the rear motor-generator 22 each function as a synchronous motor to generate driving torque while the vehicle is driven. The front motor-generator 21 and the rear motor-generator 22 each function as a generator in the regenerative process.

The wheels 10FL, 10FR, 10RL, and 10RR, which may also be collectively referred to as wheels 10, are fitted with brakes, each of which is capable of inhibiting motion of the corresponding one of the wheels. The brakes are denoted respectively by 11FL, 11FR, 11RL, and 11RR and may also be collectively referred to as brakes 11. The wheels 10FL, 10FR, 10RL, and 10RR are also fitted with wheel speed sensors, each of which determines the rotational speed of the corresponding one of the wheels. The wheel speed sensors are denoted respectively by 12FL, 12FR, 12RL, and 12RR and may also be collectively referred to as wheel speed sensors 12.

The wheel speed sensors 12 are contactless sensors capable of detecting magnetic field changes caused by rotors (gear rotors or magnet rotors) that rotate together with the wheels 10. For example, magnetic pickups, Hall elements, or magnetoresistive (MR) elements may suitably be used as the wheel speed sensors 12 to detect the changes. The wheel speed sensors 12 are coupled to an EV-CU 60, which will be described later.

In the all-wheel-drive electric vehicle 1 (hereinafter also simply referred to as a "vehicle 1") as described above, the front wheels 10FL and 10FR are directly driven by the front motor-generator 21, and the rear wheels 10RL and 10RR are directly driven by the rear motor-generator 22. The driving force is variably allocated among the front and rear wheels 10 as desired, with a balance between the driving force of the front motor-generator 21 and the driving force of the rear motor-generator 22 being controlled. The front motor-generator 21 and the rear motor-generator 22 may also be used for the regenerative process during braking.

The drive of the front motor-generator 21 and the drive of the rear motor-generator 22 are comprehensively controlled by the EV-CU 60. The EV-CU 60 is coupled to a vehicle dynamics control unit (VDCU) 50 by a controller area network (CAN) 100 in such a manner that the EV-CU 60 and the VDCU 50 can communicate with each other. The VDCU 50 reduces the possibility of skidding of the vehicle 1 to improve the traveling stability.

The EV-CU 60 and the VDCU 50 each include: a microprocessor configured to perform arithmetic operations; electrically erasable programmable read-only memory (EE-PROM) configured to store programs for causing the microprocessor to execute various kinds of processing; random-access memory (RAM) configured to store various kinds of data such as results of arithmetic operations; backup RAM configured to protect the stored data from being lost; and an input-output interface (I/F).

Devices coupled to the VDCU 50 include a steering angle sensor 16, a longitudinal acceleration sensor (longitudinal G sensor) 55, a lateral acceleration sensor (lateral G sensor) 56, a yaw rate sensor 57, and a brake switch 58. The longitudinal acceleration sensor 55 determines the forward or backward acceleration of the vehicle 1, and the lateral acceleration sensor 56 determines the lateral acceleration of the vehicle 1. The steering angle sensor 16 determines the angle of rotation of a pinion shaft to determine the turning angle of steered wheels (the front wheels 10FL and 10FR), that is, the steering angle of a steering wheel 15. The yaw rate sensor 57 determines the yaw rate of the vehicle 1.

The VDCU 50 drives a brake actuator in accordance with the operation amount (depression) of the brake pedal such that brakes are applied to the vehicle 1. The VDCU 50 receives input from various sensors (e.g., the wheel speed sensors 12, the steering angle sensor 16, the longitudinal acceleration sensor 55, the lateral acceleration sensor 56, and the yaw rate sensor 57) to determine the behavior of the vehicle 1. The VDCU 50 then effects automatic pressurization to control both the brakes and the motor torque in such a way as to reduce the possibility of skidding of the vehicle 1, which can thus provide enhanced traveling stability during cornering. For example, if the vehicle 1 enters a corner too quickly or the driver who drives the vehicle 1 jerks the steering wheel aggressively, the vehicle 1 can get out of balance or exhibit erratic behavior, in which case the VDCU 50 prevents or reduces the possibility of skidding and enables the vehicle 1 to travel with high stability. The VDCU 50 drives the brake actuator in response to a braking request from the EV-CU 60 such that brakes are applied to the vehicle 1. The braking request will be described in detail later.

The VDCU 50 receives, from the sensors, input about the steering angle, the longitudinal acceleration, the lateral acceleration, the yaw rate, and brake application information (braking information) and then transmits them to the EV-CU 60 through the CAN 100. The VDCU 50 receives, for example, information about the braking request from the EV-CU 60 through the CAN 100.

Various sensors are coupled to the EV-CU 60. Examples of the sensors include an accelerator pedal depression degree sensor 61, a resolver 62, a resolver 63, and the wheel speed sensors 12. The accelerator pedal depression degree sensor 61 determines the amount of depression made on the accelerator pedal (the degree of accelerator pedal depression). The resolver 62 determines the rotational position (the number of revolutions) of the front motor-generator 21. The resolver 63 determines the rotational position (the number of revolutions) of the rear motor-generator 22. Each of the wheel speed sensors 12 determines the speed of the corresponding one of the wheels 10.

The EV-CU 60 receives various kinds of information from the VDCU 50 through the CAN 100. Examples of the information include the steering angle, the longitudinal acceleration, the lateral acceleration, the yaw rate, and the brake application information (the braking information).

The EV-CU 60 controls, based on the received information, the drive of the front motor-generator 21 and the drive of the rear motor-generator 22 in a comprehensive manner. The EV-CU 60 specifies the target torque (torque command value) of each of the front motor-generator 21 and the rear motor-generator 22, based on, for example, the degree of accelerator pedal depression (the driving force demanded by the driver), the driving status (e.g., speed) of the vehicle 1, and the state of charge (SOC) of a high-voltage battery 71 and then outputs the specified values. In one embodiment, the EV-CU 60 may serve as a "control unit" or "controller".

The EV-CU 60 also adjusts (controls) the output torque of the front motor-generator 21 and the output torque of the rear motor-generator 22 in such a way as to allocate the driving force among the front and rear wheels in accordance with the friction of the front wheels 10FL and 10FR and the rear wheels 10RL and 10RR on a road surface. The EV-CU 60 determines the vertical load acting on the front wheels 10FL and 10FR and the rear wheels 10RL and 10RR, based on the longitudinal acceleration and the lateral acceleration of the vehicle 1 and then estimates, based on the vertical load, the friction of the wheels on a road surface.

The front motor-generator 21 and the rear motor-generator 22 are driven, in accordance with the target torque (torque command value), by a power control unit (PCU) 70 through the use of an inverter 70*a*. The inverter 70*a* includes a front inverter and a rear inverter. The direct current flowing through the high-voltage battery 71 is converted into power of three-phase current by the inverter 70*a*, which then supplies the power to the front motor-generator 21 and the rear motor-generator 22. In the regenerative process, the alternating voltage generated by the front motor-generator 21 and/or the rear motor-generator 22 is converted into direct voltage by the inverter 70*a* and is then stored in the high-voltage battery 71.

For example, the EV-CU 60 is capable of improving run-through performance (e.g., step-climbing ability) without interfering with protection against overheating (the output restriction) in a state in which the motor is locked when the vehicle 1 is trying to go over a step. The EV-CU 60 performs this function by causing the microprocessor to execute programs stored in, for example, the EEPROM.

The EV-CU 60 determines whether the front motor-generator 21 and/or the rear motor-generator 22 is locked. The front motor-generator 21 and the rear motor-generator 22 are hereinafter referred to as a motor-generator 21 and a motor-generator 22, respectively. The determination as to whether the motor-generator 21 and/or the motor-generator 22 is locked is made based on the motor torque of each of the motor-generators 21 and 22 and the number of revolutions of the each of the motor-generators 21 and 22. When detecting a locked state, the EV-CU 60 sets the target torque of the motor-generator 21 and/or the motor-generator 22 to a specified value. For example, the EV-CU 60 sets the target torque to the specified value upon satisfaction of the following conditions: the motor torque of the motor-generator 21 and/or the motor torque of the motor-generator 22 is greater than or equal to a predetermined threshold value (lock determination threshold value); and the number of revolutions (motor revolutions) of the motor-generator 21 and/or the number of revolutions (motor revolutions) of the motor-generator 22 is kept below a predetermined RPM (continuous energization impermissible RPM) at least for a predetermined time period (e.g., a few seconds). The specified value of the target torque is search target torque obtained by the addition of a predetermined value to the value of torque demanded by the driver. For example, the search target torque is about 10% to 20% greater than the value of torque demanded by the driver. The value of torque demanded by the driver is determined in accordance with the degree of accelerator pedal depression. The EV-CU 60 gradually increases the motor torque of the motor-generator 21 and/or the motor-generator 22 to the target torque.

In light of protection of components such as the inverter 70*a* from heat, the lock determination threshold value corresponds to the current value at which the components (e.g., the inverter 70*a*) are prevented from overheating (by undergoing cooling before being put into a state of overheating) in case of current concentration in a single phase. In light of protection of components such as the motor-generators 21 and 22 from heat, the continuous energization impermissible RPM is set to a value at which the components (e.g., the motor-generators 21 and 22) are prevented from overheating (by undergoing cooling before being put into a state of overheating) in case of current concentration in a single phase.

At the point in time when the EV-CU 60 determines that the locked state has ceased before or upon the lapse of a predetermined time period from the start of the increase in the motor torque (target torque) of the motor-generator 21 and/or the motor-generator 22, the EV-CU 60 stores the target torque at the point in time. For example, the EV-CU 60 stores the target torque at the point in time when the number of revolutions (motor revolutions) of the motor-generator 21 and/or the number of revolutions (motor revolutions) of the motor-generator 22 reaches or exceeds a predetermined value, that is, the target torque at the point in time when the motor-generator 21 and/or the motor-generator 22 runs at or above a predetermined RPM. Alternatively, the EV-CU 60 may store the target torque at the point in time when the number of revolutions of the wheels 10 reaches or exceeds a predetermined value. The EV-CU 60 then reduces the target torque.

After storing the target torque at the point in time when the locked state ceases, the EV-CU 60 reduces the target torque to prevent the motor-generators 21 and 22 from overheating. The newly set target torque is less than or equal to continuous operation (continuous energization) permissible torque. For example, the target torque is reduced to zero.

When the value of torque demanded by the driver reaches or exceeds the stored target torque, the EV-CU 60 sets the target torque to a value specified in accordance with the demanded torque and drives (controls) the motor-generators 21 and 22 in accordance with the newly set target torque; that is, the normal control is resumed.

At the point in time when the EV-CU 60 determines that the locked state has not ceased before or upon the lapse of the predetermined time period from the start of the increase in the motor torque (target torque) of the motor-generator 21 and/or the motor-generator 22, the EV-CU 60 stores the target torque at the point in time (the maximum value reached within the predetermined time period) and then reduces the target torque. For example, the EV-CU 60 stores the target torque at the point in time when the number of revolutions (motor revolutions) of the motor-generator 21 and/or the number of revolutions (motor revolutions) of the motor-generator 22 is less than the predetermined value. The newly set target torque is less than or equal to the continuous operation (continuous energization) permissible torque. For example, the target torque is reduced to zero.

When the value of torque demanded by the driver reaches or exceeds the stored target torque, the EV-CU 60 sets the target torque to a specified value. The specified value is search target torque obtained by the addition of a predetermined value to the value of torque demanded by the driver. The EV-CU 60 gradually increases the motor torque of the motor-generator 21 and/or the motor-generator 22 to the target torque.

At the point in time when the EV-CU 60 determines that the locked state has ceased before or upon the lapse of a predetermined time period from the start of the increase in the motor torque (target torque) of the motor-generator 21 and/or the motor-generator 22, the EV-CU 60 stores the target torque at the point in time. For example, the EV-CU 60 stores the target torque at the point in time when the number of revolutions (motor revolutions) of the motor-generator 21 and/or the number of revolutions (motor revolutions) of the motor-generator 22 reaches or exceeds the predetermined value, that is, the target torque at the point in time when the motor-generator 21 and/or the motor-generator 22 runs at or above a predetermined RPM. The newly set target torque is less than or equal to the continuous operation (continuous energization) permissible torque. For example, the target torque is reduced to zero.

When the value of torque demanded by the driver reaches or exceeds the stored target torque, the EV-CU 60 sets the target torque to a value specified in accordance with the demanded torque and drives (controls) the motor-generators 21 and 22 in accordance with the newly set target torque; that is, the normal control is resumed.

At the point in time when the EV-CU 60 determines that the locked state has not ceased before or upon the lapse of the predetermined time period from the start of the increase in the motor torque (target torque) of the motor-generator 21 and/or the motor-generator 22, the EV-CU 60 repeatedly executes the procedure (by which to terminate the motor locked-state or by which to go over a step) until the locked state ceases. For example, the EV-CU 60 repeatedly executes the procedure when the number of revolutions (motor revolutions) of the motor-generator 21 and/or the number of revolutions (motor revolutions) of the motor-generator 22 is less than the predetermined value. The procedure is what has been described above in relation to the state in which it is determined that the locked state has not ceased yet.

While reducing the target torque, the EV-CU 60 performs control in coordination with the VDCU 50, which is capable of applying brakes to the vehicle 1. In one embodiment, the VDCU 50 serves as a "braking device". The brakes are automatically applied to the vehicle 1 accordingly. In this way, the vehicle 1 is prevented from swinging back (i.e., from moving backward) while the target torque is reduced. The EV-CU 60 transmits a request that the VDCU 50 apply brakes to the vehicle 1 (the wheels 10). The VDCU 50 then drives the brake actuator in response to the braking request from the EV-CU 60 such that brakes are applied to the vehicle 1 (the wheels 10).

When the degree of accelerator pedal depression decreases to or below the predetermined lock determination threshold value, the application of brakes to the vehicle 1 is rendered ineffective by the EV-CU60. That is, the EV-CU 60 stops transmitting the request to the VDCU 50.

Figure 2:
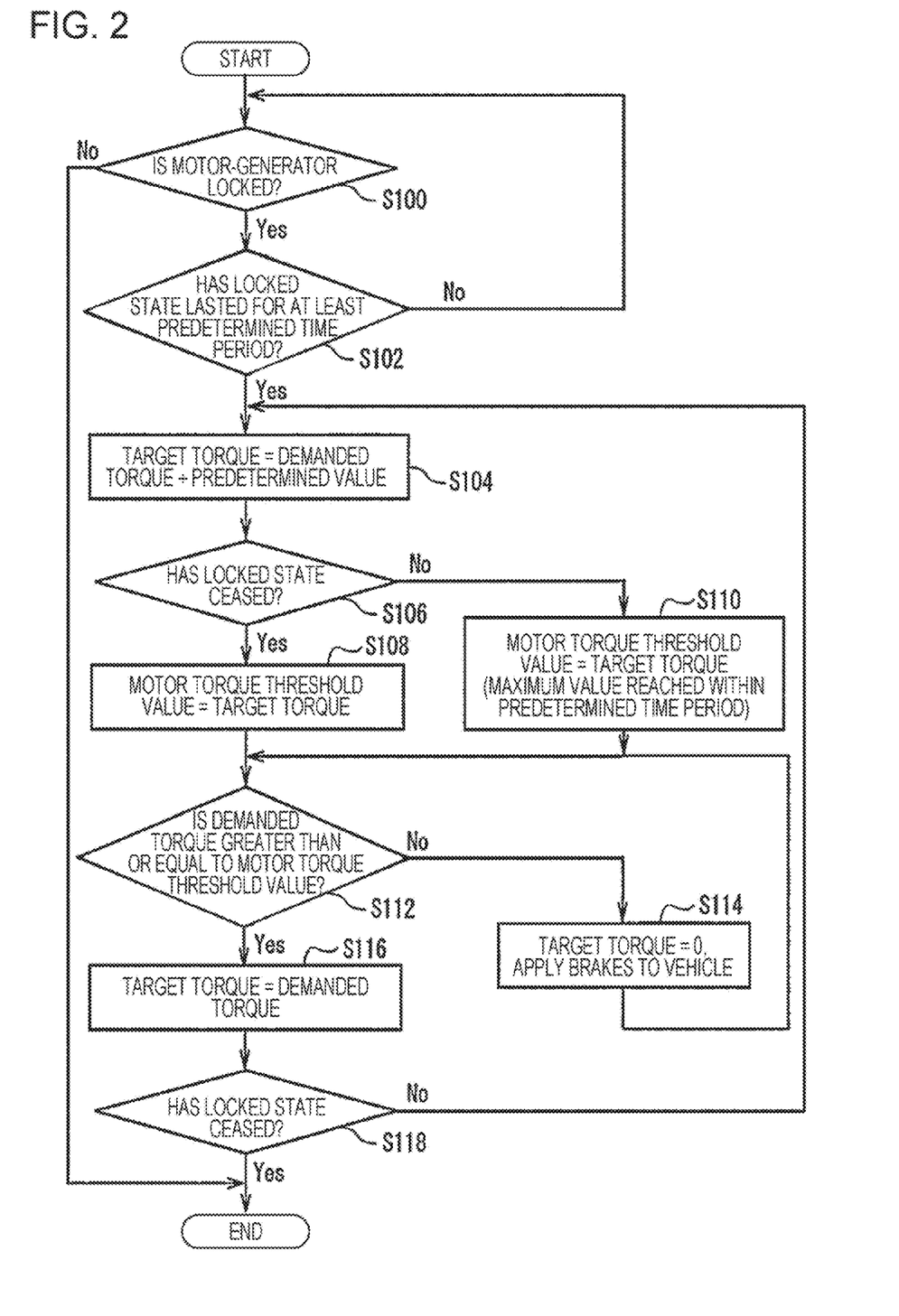
FIG. 2 is a flowchart of the procedure by which the all-wheel-drive electric vehicle according to the embodiment performs locked-state termination control (step-climbing control)
Figure 3:
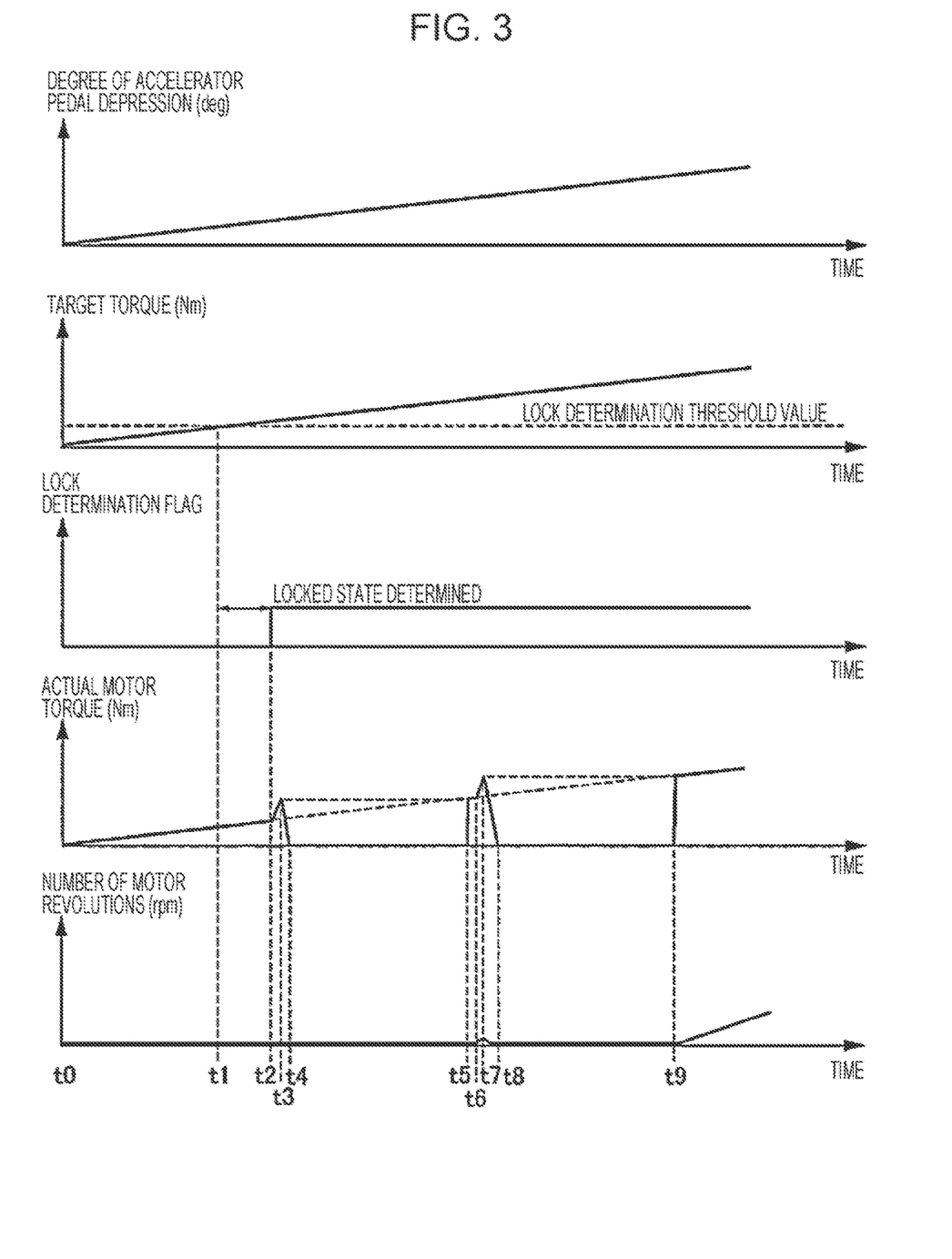
FIG. 3 is a timing chart of the degree of accelerator pedal depression, target torque, a lock determination flag, actual motor torque, and the number of motor revolutions, illustrating how they change over time while the locked-state termination control (step-climbing control) is performed by the all-wheel-drive electric vehicle according to the embodiment.

The following describes the operation of the all-wheel-drive electric vehicle 1 with reference to FIGS. 2 and 3. FIG. 2 is a flowchart of the procedure by which the all-wheel-drive electric vehicle 1 performs locked-state termination control (step-climbing control). This procedure is repeatedly executed mainly by the EV-CU 60 at predetermined timings. FIG. 3 is a timing chart of the degree of accelerator pedal depression, the target torque, a lock determination flag, actual motor torque, and the number of motor revolutions, illustrating how they change over time while the locked-state termination control (step-climbing control) is performed by the all-wheel-drive electric vehicle 1. In FIG. 3, the horizontal axes of the respective graphs represent time, and the vertical axes of the respective graphs represent in sequence from the upper section: the degree of accelerator pedal depression (deg); the target torque (in units of Nm); the lock determination flag; the actual motor torque (in units of Nm); and the number of motor revolutions (in units of rpm).

In Step S100, it is determined whether the motor-generator 21 and/or the motor-generator 22 is locked. The determination as to whether the motor-generator 21 and/or the motor-generator 22 is locked is made based on the motor torque of each of the motor-generators 21 and 22 and the number of revolutions of the each of the motor-generators 21 and 22. For example, the determination as to whether the motor-generator 21 and/or the motor-generator 22 is locked is made based on the satisfaction of the following conditions: the motor torque of the motor-generator 21 and/or the motor torque of the motor-generator 22 is greater than or equal to the predetermined threshold value (the lock determination threshold value); and the number of revolutions (motor revolutions) of the motor-generators 21 and/or the number of revolutions (motor revolutions) of the motor-generators 22 is less than the predetermined value (the continuous energization impermissible RPM). The target torque may be set to a value specified in accordance with the value of torque demanded by the driver, and the motor-generators 21 and 22 are driven (controlled) in accordance with the set target torque (see the period from the time t0 to t2 in FIG. 3).

Progression to Step S102 occurs if it is determined that the motor-generator 21 and/or the motor-generator 22 is locked (see time t1 in FIG. 3). The procedure is exited if it is determined that neither the motor-generator 21 nor the motor-generator 22 is locked.

In Step S102, it is determined whether the aforementioned state (the locked state) has lasted for at least a predetermined time period (e.g., a few seconds); that is, it is determined whether the locked state is definite. Progression to Step S104 occurs if the motor-generator 21 and/or the motor-generator 22 is kept locked for at least the predetermined time period (i.e., if the locked state is definite) (see time t2 in FIG. 3).

If the predetermined time period has not elapsed (i.e., if the locked state is indefinite), a return to Step S100 is made, and Steps S100 and S102 are repeatedly executed.

In Step S104, the target torque (motor torque demand value) of the motor-generator 21 and/or the motor-generator 22 is set to a specified value. The specified value is the search target torque obtained by the addition of a predetermined value to the value of torque demanded by the driver. For example, the search target torque is about 10% to 20% higher than the value of torque demanded by the driver. The value of torque demanded by the driver is determined in accordance with the degree of accelerator pedal depression. The motor torque (target torque) of the motor-generator 21 and/or the motor-generator 22 is gradually increased to the specified value (see the period from the time t2 to t3 (and the period from the time t6 to t7) in FIG. 3).

In Step S106, it is determined whether the locked state has ceased before or upon the lapse of a predetermined time period from the start of the increase in the motor torque (target torque) of the motor-generator 21 and/or the motor-generator 22. For example, it is determined whether the number of revolutions (motor revolutions) of the motor-generators 21 and/or the number of revolutions (motor revolutions) of the motor-generators 22 is greater than or equal to a predetermined value, that is, whether the motor-generator 21 and/or the motor-generator 22 runs at or above a predetermined RPM. Progression to Step S108 occurs if the locked state has ceased. Progression to Step S110 occurs if the locked state has not ceased yet.

In Step S108, the target torque (motor torque) at the point in time (when it is determined that the locked state has ceased) is stored; that is, the target torque is assigned as a motor torque threshold value. Then, progression to Step S112 occurs.

In Step S110, the target torque at the point in time (when it is determined that the locked state has not ceased yet), that is, the maximum value reached within a predetermined time period is stored. In other words, the maximum value of the target torque reached within the predetermined time period is assigned as the motor torque threshold value. Then, progression to Step S112 occurs.

In Step S112, it is determined whether the value of torque demanded by the driver is greater than or equal to the value of the target torque (the motor torque threshold value) stored. Progression to Step S116 occurs if the value of the demanded torque is greater than or equal to the value of the stored target torque (the motor torque threshold value). Progression to Step S114 occurs if the value of the demanded torque is less than the value of the stored target torque (the motor torque threshold value).

In Step S114, the target torque is reduced to or below the continuous operation (continuous energization) permissible torque (see the period from the time t4 to t5 (and the period from the time t8 to t9) in FIG. 3). For example, the target torque is reduced to zero. While the target torque is reduced, the EV-CU 60 performs control in coordination with the VDCU 50 such that brakes are automatically applied to the vehicle 1. Then, progression to Step S112 occurs, and Steps S112 and S114 are repeatedly executed until the value of torque demanded by the driver reaches or exceeds the value of the stored target torque (the motor torque threshold value).

In Step S116, the target torque is set to a value specified in accordance with the value of torque demanded by the driver, and the motor-generators 21 and 22 are driven (controlled) in accordance with the newly set target torque (see the period from the time t5 to t6 (and the period from the time t9) in FIG. 3).

In Step S118, it is determined whether the locked state has ceased before or upon the lapse of a predetermined time period. The determination as to whether the locked state has ceased is made in the manner described above and will not be further elaborated here. The procedure is exited if the locked state has ceased (see the period from the time t9 in FIG. 3). If the locked state has not ceased yet, a return to Step S104 is made, and Steps S104 to S118 are repeatedly executed.

The present embodiment, which has been described above in detail, involves the following feature: when the locked state is detected, the motor-generator 21 and/or the motor-generator 22 is driven with target torque higher than the value of torque demanded by the driver. The present embodiment thus enables a search for the (minimum) value of torque necessary to cause the motor-generator 21 and/or the motor-generator 22 to rotate (i.e., to go out of the locked state). If the torque is not determined (specified) in a single search, the search process is repeated multiple times as appropriate. This improves the reliability of the search for the (minimum) value of torque necessary to cause the motor-generator 21 and/or the motor-generator 22 to rotate (i.e., to go out of the locked state).

The target torque (motor torque) is then reduced until the value of torque demanded by the driver reaches the determined (specified) value, that is, the (minimum) value of torque necessary to cause the motor-generator 21 and/or the motor-generator 22 to rotate (i.e., to go out of the locked state). The components such as the motor-generators 21 and 22 are thus prevented from overheating. In other words, the motor-generator 21 and/or the motor-generator 22 is prevented from remaining energized (carrying high current) while being locked (e.g., while the vehicle 1 is stuck at a step).

When the value of the demanded torque reaches the value of torque necessary to cause the motor-generator 21 and/or the motor-generator 22 to rotate (i.e., to go out of the locked state), the motor-generator 21 and/or the motor-generator 22 is driven at the torque concerned (i.e., the target torque). The locked state thus ceases, in which case the vehicle 1 can go over the step. This feature improves the run-through performance (e.g., step-climbing ability) without interfering with protection against overheating (the output restriction) in a state in which the motor is locked when the vehicle 1 is, for example, trying to go over a step.

The present embodiment enables a search for the (minimum) value of the torque necessary to terminate the locked state (e.g., the torque necessary for the vehicle 1 to go over a step). Thus, the motor torque will not be increased to a larger extent than is necessary when the vehicle 1 starts moving after the locked state ceases. This feature eliminates or reduces the possibility that the vehicle 1 will suddenly jump forward after the locked state ceases (e.g., after the vehicle 1 goes over the step).

The present embodiment provides improved run-through performance (e.g., step climbing ability) without disposing (adding), for example, a clutch or a torque converter between the motor-generator (21 or 22) and the (driving) wheels 10.

After storing the target torque at the point in time when the locked state ceases, the target torque is reduced. The newly set target torque is less than or equal to the continuous operation (continuous energization) permissible torque. For example, the target torque is reduced to zero. In this way, the motor-generators 21 and 22 are effectively prevented from overheating.

While reducing the target torque, the EV-CU 60 performs control in coordination with the VDCU 50 such that brakes are automatically applied to the vehicle 1 (the wheels 10). In this way, the vehicle 1 according to the present embodiment is appropriately prevented from swinging back (i.e., from moving backward) while the target torque is reduced. The application of brakes to the vehicle 1 according to the present embodiment is rendered ineffective in an appropriate manner when the degree of accelerator pedal depression decreases to or below the predetermined lock determination threshold value.

Although an embodiment of the disclosure has been described so far, it is noted that the disclosure is not limited to the embodiment; that is, various alterations may be made. For example, the embodiment is adopted into the all-wheel-drive electric vehicle 1 as described above including the front motor-generator 21 capable of driving the left front wheel 10FL and the right front wheel 10FR and the rear motor-generator 22 capable of driving the left rear wheel 10RL and the right rear wheel 10RR. The embodiment of the disclosure may be adopted into an all-wheel-drive electric vehicle including four wheels provided with the respective in-wheel motors. Although a double-motor electric vehicle (BEV) has been described above, the disclosure is also applicable to a single-motor electric vehicle. Examples of such a vehicle include battery electric vehicles (BEVs), hybrid electric vehicles (HEV), plug-in hybrid electric vehicles (PHEVs), and fuel cell electric vehicles (FCVs).

When the locked state is detected, the target torque is set to the value obtained by the addition of the predetermined value to the value of torque demanded by the driver. In the embodiment above, this procedure is repeatedly executed until the locked state ceases. In some embodiments, however, the target torque is gradually (continuously) increased until the locked state ceases.

The system configuration of controllers such as the EV-CU 60 and the VDCU 50 and the sharing of functions between these controllers are not limited to those described in relation to the embodiment. The wheel speed sensors 12 in the embodiment are coupled to the EV-CU 60. In some embodiments, the wheel speed sensors 12 are coupled to the VDCU 50, in which case data received by the VDCU 50 may be transmitted to the EV-CU 60 through the CAN 100. Although the EV-CU 60, the PCU 70, and the VDCU 50 in the embodiment are coupled to each other by the CAN 100 in such a manner that the EV-CU 60, the PCU 70, and the VDCU 50 can communicate with each other, any system configuration change (e.g., integration) may be made with consideration given to, for example, functional requirements and costs.

The control unit (controller) including the VDCU 50 and the EV-CU 60 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An electric vehicle comprising:
  an electric motor being a synchronous motor configured to directly drive at least one wheel;
  one or more processors; and
  one or more memories storing instructions causing the one or more processors to control the electric motor in accordance with a target torque, wherein
  the one or more processors are caused to
    determine, based on motor torque of the electric motor and a number of revolutions of the electric motor, whether the electric motor is in a locked state,
    based on determining that the electric motor is in the locked state, set, as the target torque of the electric motor, a first search target torque having a value greater than a first value of torque demanded by a driver, and execute a first increase of the motor torque up to the set target torque, each value of the torque demanded by the driver being determined in accordance with a degree of accelerator pedal depression by the driver,
    upon making a first determination that the locked state is ceased before or upon a lapse of a predetermined time period from a start of the first increase of the motor torque, store a first value of the target torque at a time of making the first determination, and execute a first decrease of the target torque after storing the first value of the target torque, and
    when a second value of the torque demanded by the driver becomes the first value of the target torque or more after the first decrease of the target torque, set a second value of the target torque in accordance with the second value of the torque demanded by the driver, and drive the electric motor in accordance with the set second value of the target torque.

2. The electric vehicle according to claim 1, wherein the one or more processors are further caused to
  upon determining that the electric motor is in the locked state, until making the first determination that the locked state is ceased, repeatedly perform a process, the process comprising:
    setting, as the target torque of the electric motor, a further search target torque obtained by addition of a predetermined value to a further value of the torque demanded by the driver, and executing a further increase of the motor torque of the electric motor up to the further search target torque; and
    upon making a further determination that the locked state has not ceased before or upon a lapse of a predetermined time period from a start of the further increase of the motor torque of the electric motor, storing a further value of the target torque at a time of making the further determination, and executing a further decrease of the target torque after storing the further value of the target torque.

3. The electric vehicle according to claim 2, wherein the one or more processors are further caused to execute the first decrease of the target torque so that the target torque becomes equal to or less than a continuous operation permissible torque, after storing the first value of the target torque at the time of making the first determination.

4. The electric vehicle according to claim 1, further comprising a vehicle dynamics control unit (VDCU) configured to apply braking to the electric vehicle, wherein
the one or more processors are further caused to, during the first decrease of the target torque, drive a brake actuator to apply braking to the electric vehicle.

5. The electric vehicle according to claim 2, further comprising a vehicle dynamics control unit (VDCU) configured to apply braking to the electric vehicle, wherein
the one or more processors are further caused to, during the first decrease of the target torque, drive a brake actuator to apply braking to the electric vehicle.

6. The electric vehicle according to claim 3, further comprising a vehicle dynamics control unit (VDCU) configured to apply braking to the electric vehicle, wherein
the one or more processors are further caused to, during the first decrease of the target torque, drive a brake actuator to apply braking to the electric vehicle.

7. The electric vehicle according to claim 4, further comprising a vehicle dynamics control unit (VDCU) configured to apply braking to the electric vehicle, wherein
the one or more processors are further caused to, render an application of the braking to the electric vehicle ineffective when the degree of the accelerator pedal depression decreases to or below a predetermined lock determination threshold value.

8. The electric vehicle according to claim 5, further comprising a vehicle dynamics control unit (VDCU) configured to apply to the electric vehicle, wherein
the one or more processors are further caused to, render an application of the braking to the electric vehicle ineffective when the degree of the accelerator pedal depression decreases to or below a predetermined lock determination threshold value.

9. The electric vehicle according to claim 6, further comprising a vehicle dynamics control unit (VDCU) configured to apply braking to the electric vehicle, wherein
the one or more processors are further caused to, render an application of the braking to the electric vehicle ineffective when the degree of the accelerator pedal depression decreases to or below a predetermined lock determination threshold value.

* * * * *